(12) United States Patent
Jacobs et al.

(10) Patent No.: US 10,293,997 B2
(45) Date of Patent: May 21, 2019

(54) FILM AND METHOD FOR PACKAGING A COMPRESSIBLE PRODUCT IN A COMPRESSED STATE AND PACKAGED COMPRESSIBLE PRODUCT

(71) Applicant: Combipac BV, Hardenberg (NL)

(72) Inventors: Bruno Jacobs, Sint-Amands (BE); Lesley Hoorens, Wetteren (BE)

(73) Assignee: Combipac BV, Hardenberg (NL)

( * ) Notice: Subject to any disclaimer, the term of this patent is extended or adjusted under 35 U.S.C. 154(b) by 735 days.

(21) Appl. No.: 14/625,154

(22) Filed: Feb. 18, 2015

(65) Prior Publication Data
US 2015/0232221 A1    Aug. 20, 2015

(30) Foreign Application Priority Data
Feb. 18, 2014   (EP) ..................................... 14155573

(51) Int. Cl.
| | | |
|---|---|---|
| *B32B 1/02* | (2006.01) | |
| *B65D 71/08* | (2006.01) | |
| *B65B 63/02* | (2006.01) | |
| *B29C 65/82* | (2006.01) | |
| *B29C 65/00* | (2006.01) | |
| *B29C 65/02* | (2006.01) | |
| *B65D 75/00* | (2006.01) | |
| *B65D 85/07* | (2017.01) | |
| *B32B 27/08* | (2006.01) | |
| *B32B 27/30* | (2006.01) | |
| *B32B 27/32* | (2006.01) | |
| *B65B 11/50* | (2006.01) | |
| *B65B 11/52* | (2006.01) | |
| *B65B 51/10* | (2006.01) | |
| *B29C 65/08* | (2006.01) | |
| *B29C 65/18* | (2006.01) | |
| *B29C 65/04* | (2006.01) | |

(52) U.S. Cl.
CPC .............. *B65D 71/08* (2013.01); *B29C 65/02* (2013.01); *B29C 65/8215* (2013.01); *B29C 66/344* (2013.01); *B29C 66/43* (2013.01); *B29C 66/73712* (2013.01); *B32B 27/08* (2013.01); *B32B 27/30* (2013.01); *B32B 27/302* (2013.01); *B32B 27/306* (2013.01); *B32B 27/32* (2013.01); *B32B 27/325* (2013.01); *B32B 27/327* (2013.01); *B65B 11/50* (2013.01); *B65B 11/52* (2013.01); *B65B 51/10* (2013.01); *B65B 63/02* (2013.01); *B65D 75/002* (2013.01); *B65D 75/006* (2013.01); *B65D 85/07* (2018.01); *B29C 65/04* (2013.01); *B29C 65/08* (2013.01); *B29C 65/18* (2013.01); *B29C 66/71* (2013.01); *B29C 66/723* (2013.01); *B29C 66/73921* (2013.01); *B32B 2250/246* (2013.01); *B32B 2439/00* (2013.01); *B32B 2439/46* (2013.01); *B32B 2439/70* (2013.01); *Y10T 428/1334* (2015.01); *Y10T 428/1345* (2015.01); *Y10T 428/1352* (2015.01); *Y10T 428/31913* (2015.04)

(58) Field of Classification Search
CPC ...... B65D 71/08; B65D 75/006; B32B 27/08; B32B 27/30; B32B 27/302; B32B 27/32; B32B 27/325; B32B 25/327; B32B 2439/00; B32B 2439/46; B32B 2439/70; B32B 1/02; Y10T 428/1334; Y10T 428/1345; Y10T 428/1352; B65B 11/50; B65B 11/52; B65B 51/10; B65B 63/02
See application file for complete search history.

(56) References Cited

U.S. PATENT DOCUMENTS

| | | | | |
|---|---|---|---|---|
| 4,384,024 | A | * | 5/1983 | Mitchell ................. B32B 27/32 264/171.27 |
| 2002/0012807 | A1 | | 1/2002 | Kurian et al. |
| 2003/0211298 | A1 | | 11/2003 | Migliorini et al. |
| 2013/0294821 | A1 | | 11/2013 | Eberle et al. |

FOREIGN PATENT DOCUMENTS

EP             0908400          4/1999

OTHER PUBLICATIONS

European Written Opinion and Search Report for EP 15 155 499.5, dated May 28, 2015, (5 pages).
ASTM International, ASTM F88/F88M-09, Standard Test Method for Seal Strength of Flexible Barrier Materials, West Conshohocken, PA, 2009, pp. 1-11.
ASTM International, ASTM F2029-08, Standard Practices for Making Heatseals for Determination of Heatsealability of Flexible Webs as Measured by Seal Strength, West Conshohocken, PA, 2008, pp. 1-8.
ASTM International, ASTM D882-12, Standard Test Method for Tensile Properties of Thin Plastic Sheeting, West Conshohocken, PA, 2012, pp. 1-12.

(Continued)

*Primary Examiner* — Walter Aughenbaugh
(74) *Attorney, Agent, or Firm* — McDonnell Boehnen Hulbert & Berghoff LLP

(57) ABSTRACT

The present invention relates to a method for packaging a compressible product in a compressed state, comprising the step of sealing at least two parts of a polymeric machine direction oriented (MDO) film which encloses at least part of the compressible product in the compressed state, characterized in that the seal has a seal elongation at failure of about 20% to about 100%, as measured in accordance with ASTM F88/F88M-09. The present invention also relates to a compressible product in a compressed state packaged in a polymeric MDO film which encloses at least part of the compressible product, wherein at least two parts of the MDO film are sealed and characterized in that the seal has a seal elongation at failure of about 20% to about 100%, as measured in accordance with ASTM F88/F88M-09.

26 Claims, 1 Drawing Sheet

(56) References Cited

OTHER PUBLICATIONS

International Organization for Standardization, ISO 899-1-2003: Plastics—Determination of creep behaviour—Part 1: Tensile creep, 2003 (20 pages).

* cited by examiner

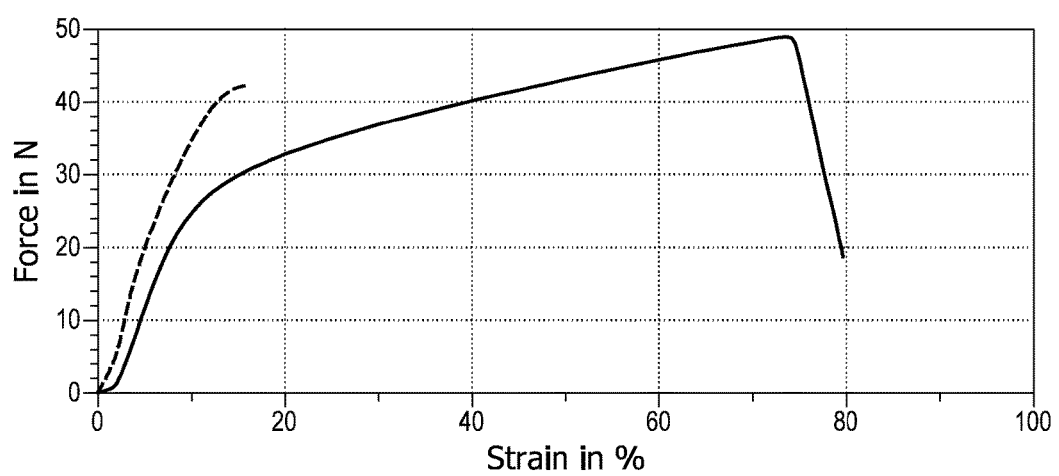

FILM AND METHOD FOR PACKAGING A COMPRESSIBLE PRODUCT IN A COMPRESSED STATE AND PACKAGED COMPRESSIBLE PRODUCT

FIELD

The present invention is in the field of packaging compressible products such as mineral wool products in a compressed state. The present invention provides a film and a method for packaging a compressible product in a compressed state. The present invention also relates to a packaged compressible product in a compressed state.

BACKGROUND

Compressible products which are used in the building sector for thermal and acoustic insulation such as mineral wool products may be packaged at different stages in order to reduce the space such products occupy during storage and transport.

Mineral wool products such as glass mineral wool and rock mineral wool products may be packaged at a first stage with a primary wrap film. A compressible product such as a mineral wool mat may be rolled up in a roll packer together with the primary film and may be closed by an adhesive at the end of the roll up process to have finally a packaged mineral wool roll. In this process, a polyolefin film may be used as primary packaging material. Mineral wool slabs are packed in a different way: a polyolefin film is generally applied to the upper and lower surface of the slab or a pile of slabs before compression. A single mineral wool slab or a pile of multiple slabs may be compressed and the lower and upper film may be sealed at the front and back to close the package. The mineral wool slab or pile of multiple mineral wool slabs is then released from compression and is limited in expansion due to the holding force of the film.

During a secondary packaging stage, multiple previously packaged mineral wool rolls or slabs are compressed and pushed in a first and second sheet of film sealed at one end, and the package is closed by sealing the other end. The multiple mineral wool rolls or slabs are released from compression and are limited in expansion due to the holding force of the film. The obtained package is called a multipack. Sometimes, there is a tertiary packaging stage, where multiple multipacks are again compressed and pushed in a first and second sheet of film sealed at one end and the package is closed by sealing the other end. The multiple multipacks are released from compression and are limited in expansion due to the holding force of the film.

In the packaging stages, typically a polyolefin film is used whereby the thickness of the film depends on multiple factors including the compression ratio of the compressible product such as the mineral wool product. The film has to withstand high forces due the expansion force of the packaged rolls or slabs which are trying to revert to their original state. The creep of a film, i.e., the tendency of the film to elongate, generally decreases when the thickness of the film increases. However, for economical reasons and in order to comply with ecological requirements, it is desirable to keep the film as thin as possible.

Conventional non-oriented polyolefin films are used for packaging compressible products. For instance, EP 0908400 describes a mineral wool product compression-packaged in a film of polyethylene comprising high density polyethylene. However, these conventional non-oriented polyolefin films have high creep, i.e., high tendency to elongate, resulting in too high growing ratios of the packages. As a consequence, the compression ratios on the mineral wool are limited and rather thick films are to be used to compensate the poor creep properties.

The latest trend in packing mineral wool products is the use of machine direction oriented (MDO) films which can withstand high expansion forces in the machine direction. These existing MDO films have a low creep in the machine direction which leads to a very high tendency of the packaged product to stay in the compressed state. The existing MDO films have such low creep performance that even the thickness of the films can be reduced in comparison with the above mentioned conventional non-oriented polyolefin films. However, when using the existing MDO films for packaging a compressible product in a compressed state, a drawback of these films is their relatively poor heat sealing properties. For instance, sealing bars have to be well aligned and maintained with a lot of attention on a very regular basis, to get reasonable heat seals with these existing MDO films. But even when sealed on adapted sealing bars (e.g., Flex-weld sealing bars from Qubiqa), the heat seals of the mineral wool packages prepared with the existing MDO films are fragile and form the weak point of the packaged compressible product. Mineral wool packs prepared with the existing MDO films are frequently popping open due to the poor sealing behaviour of these films.

Key in packing compressible products such as mineral wool products in a compressed state is to compress these products to a high degree to get a package with limited volume which can be stored and transported in an economical way, while being able to withstand the expansion forces of the packaged compressible product in the compressed state.

In view thereof, there exists a need for further and/or improved films and methods for packaging compressible products in a compressed state and/or packaged compressible products which comply at least partly with the aforementioned requirements and solve at least to a certain extent the aforementioned problems.

SUMMARY

The present inventors have found machine direction oriented (MDO) films for packaging compressible products in a compressed state which allow storing and transporting the packaged compressible products in an efficient and hence economical way and at the same time provide improved environmental sustainability.

Hence, a first aspect of the present invention relates to a method for packaging a compressible product in a compressed state, comprising the step of sealing at least two parts of a polymeric MDO film which encloses at least part of the compressible product in the compressed state, characterised in that the seal has a seal elongation at failure of about 20% to about 100%, as measured in accordance with ASTM F88/F88M-09.

A further aspect relates to a compressible product in a compressed state packaged in a polymeric MDO film which encloses at least part of the compressible product, wherein at least two parts of the MDO film are sealed and characterised in that the seal has a seal elongation at failure of about 20% to about 100%, as measured in accordance with ASTM F88/F88M-09.

A further aspect relates to a polymeric MDO film for packaging a compressible product in a compressed state, characterised in that the MDO film, when at least two parts of the MDO film are sealed, provides a seal with a seal elongation at failure of about 20% to about 100%, as measured in accordance with ASTM F88/F88M-09.

Such an MDO film embodying the principles of the present invention has satisfying heat sealing properties. The present MDO film allows packaging a compressible product in a compressed state by sealing at least two parts of the MDO film without the need to regularly align the heat sealing bars on a packaging line. Furthermore, a seal prepared with the present MDO film is able to resist better the expansion forces of the compressed product during storage and/or transport of the packaged product. The present inventors also found that a seal prepared with the present MDO film better withstands movements and shocks associated with transporting the packaged product.

The above and further aspects and preferred embodiments of the invention are described in the following sections and in the appended claims. The subject-matter of appended claims is hereby specifically incorporated in this specification.

BRIEF DESCRIPTION OF FIGURES

FIG. 1 represents a graph (heat seal curve) illustrating the seal strength (in N) versus the heat seal elongation (in %) of a seal prepared with an MDO film illustrating the principles of the present invention (full line) and of a seal prepared with an existing mono-oriented film according to the prior art (dashed line).

DETAILED DESCRIPTION

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms also encompass "consisting of" and "consisting essentially of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of and from the specified value, such as variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Whereas the term "one or more", such as one or more members of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All documents cited in the present specification are hereby incorporated by reference in their entirety.

Unless otherwise specified, all terms used in disclosing the invention, including technical and scientific terms, have the meaning as commonly understood by one of ordinary skill in the art to which this invention belongs. By means of further guidance, term definitions may be included to better appreciate the teaching of the present invention.

As noted, the present inventors have found that when using an MDO film for packaging a compressible product in a compressed state which gives a seal having a seal elongation of about 20% to about 100%, it is possible to get a package which is able to withstand better the expansion forces of the compressed product, and shocks and movements exerted on the packaged products during transportation thereof.

Accordingly, in a first aspect, the invention provides a method for packaging a compressible product in a compressed state, comprising the step of sealing at least two parts of a polymeric MDO film which encloses at least part of the compressible product in the compressed state, characterised in that the seal has a seal elongation at failure of about 20% to about 100%, as measured in accordance with ASTM F88/F88M-09.

A related aspect provides the use of the MDO film as defined herein for packaging a compressible product in a compressed state.

The terms "packaging" and "packing" can be used interchangeably herein and refer to at least partly wrapping an item or set of items. The package may protect the item(s) during storage and/or transport.

In certain embodiments, the method comprises the step of sealing at least two parts of an MDO film which encloses at least part of a compressible product in a compressed state.

The term "sealing" refers to joining at least two items together so as to prevent them coming apart and/or to prevent anything passing between them. The recitation "sealing at least two parts of a polymeric MDO film", as used herein, comprises joining at least two parts of a polymeric MDO film together so as to prevent them coming apart. Advantageously, the sealing, preferably heat sealing, obviates the need to use an adhesive to bind the at least two items, such as the at least two parts of the polymeric MDO film, together.

The term "seal", as used herein, refers to the area or path where the at least two parts of the MDO film are joined together so as to prevent them coming apart. In certain preferred embodiments, the seal is a permanent seal. In case the seal is a permanent seal, the packaged product may be opened by cutting the MDO film as defined herein.

The sealing step may be performed by any method known in the art suitable for sealing MDO films such as heat sealing, ultrasonic sealing, or high frequency sealing.

The term "heat sealing" refers to the process of sealing at least two items, for instance sealing at least two parts of a polymeric MDO film, using heat, time, and pressure. The method of heat sealing utilizes a constantly heated die or sealing bar to apply heat to a specific contact area or path to heat seal or weld the items together. The terms "heat sealing" or "welding" may be used interchangeably herein.

The term "ultrasonic sealing" refers to the process of sealing at least two items, for instance sealing at least two parts of a polymeric MDO film, using high-frequency ultrasonic acoustic vibrations. The high-frequency ultrasonic acoustic vibrations are locally applied to the at least two items being held together under pressure to create a solid-state weld between the at least two items.

The term "high frequency sealing" refers to the process of sealing at least two items, for instance sealing at least two parts of a polymeric MDO film, by heating with high frequency electromagnetic waves. The terms "high frequency sealing", "dielectric sealing", or "radio frequency heat sealing" may be used interchangeably herein.

In order to allow sealing at least two parts of a polymeric MDO film, the MDO film as defined herein or the outer layer of the MDO film as defined herein may be made of a thermoplastic material, such as polyethylene or polypropylene.

The term "thermoplastic" generally refers to a polymer that becomes pliable or mouldable above a specific temperature, and returns to a solid state upon cooling.

In certain embodiments, the sealing may comprise heat sealing. In certain embodiments, the sealing is heat sealing. In certain embodiments, the parts of the MDO film may be sealed by heat sealing.

In certain embodiments, the parts of the MDO film may be sealed by heat sealing with heat sealing bars, hot air, or impulse heat sealers.

Heat sealing bars generally have heated tooling kept at a constant temperature (also known as direct contact thermal sealing). Heat sealing bars typically use one or more heated bars which contact the items to heat the interface and form a bond. The bars may have various configurations and can be covered with a release layer or utilize various slick interposer materials (i.e. Teflon films) to prevent sticking to the hot tooling. Suitable non-limiting examples of heat sealing bars are Flexweld (from Qubiqa), Integrity Seal™ (from International Food Partners Ltd), and others.

Impulse heat sealers generally have heating elements (one or two) of Nichrome placed between a resilient synthetic rubber and a release surface of film or fabric. The heating elements are typically not continuously heated; heat is generated only when current flows. When the items are placed in the heat sealer, they are held in place by pressure. An electric current heats the heating element for a specified time to create the required temperature. The jaws hold the items in place after the heat is stopped, sometimes with cooling water; this allows the items to fuse before stress can be applied.

In certain embodiments, the method may comprise the step of sealing, preferably heat sealing, at least two parts of an MDO film which encloses at least part of a compressible product in a compressed state.

The recitation "an MDO film which encloses at least part of a compressible product", as used herein, is meant to encompass an MDO film which is provided at the outer surface of at least part of the compressible product. The terms "to enclose", "to cover", "to overlap with", or "to be provided at" may be used interchangeably herein.

In certain embodiments, the at least two parts of an MDO film may be parts of one (sheet of an) MDO film as defined herein. In certain embodiments, the at least two parts of an MDO film may be a part of a first (sheet of an) MDO film as defined herein and a part of a second (sheet of an) MDO film as defined herein.

In certain embodiments, the part of the MDO film which is to be sealed may be located or positioned at the end of the MDO film. Alternatively, in certain embodiments, the part of the MDO film which is to be sealed may be located or positioned within the MDO film, and during or after sealing the MDO film may be cut.

In certain embodiments, the sealing step may be part of any known method for compression packaging. In certain embodiments, the MDO film as defined herein may be applied (e.g., by enclosing at least part of the compressible product with the MDO film as defined herein) after compression, and sealed, preferably heat sealed, or the MDO film as defined herein may be applied (e.g., by enclosing at least part of the compressible product with the MDO film as defined herein) prior to compression and then sealed, preferably heat sealed, after compression.

In certain embodiments, the method may comprise the steps of: providing a compressible product in an uncompressed or partly compressed state, providing an MDO film as defined herein, enclosing at least part of the compressible product with the MDO film, compressing the compressible product to a compressed state, and sealing, preferably heat sealing, at least two parts of the MDO film which encloses at least part of the compressible product in the compressed state. Hereby, the MDO film as defined herein maintains or keeps the product in the compressed state.

In certain embodiments, the method may comprise the steps of: providing a compressible product in a compressed state, providing an MDO film as defined herein, enclosing at least part of the compressible product in the compressed state with the MDO film, and sealing, preferably heat sealing, at least two parts of the MDO film which encloses at least part of the compressible product in the compressed state. Hereby, the MDO film as defined herein maintains or keeps the product in the compressed state.

In certain embodiments, when the compressible product, such as a mineral wool product, is a slab (or plate) or a pile of slabs (or plates), one (sheet of the) MDO film as defined herein may enclose at least part of the upper and the lower surface of the slab (or plate) or pile of slabs (or plates), the compressible product may be compressed, and the (sheet of the) MDO film as defined herein may be sealed, preferably heat sealed.

Alternatively, in certain embodiments, when the compressible product, such as a mineral wool product, is a slab (or plate) or a pile of slabs (or plates), one (sheet of the) MDO film as defined herein (i.e., the upper or first sheet of MDO film) may enclose at least part of the upper surface of the slab (or plate) or pile of slabs (or plates) and another (sheet of the) MDO film as defined herein (i.e., the lower or second sheet of MDO film) may enclose at least part of the lower surface of the slab (or plate) or pile of slabs (or plates), the compressible product may be compressed, and the (sheets of the) MDO films as defined herein may be sealed, preferably heat sealed.

In certain embodiments, a first and second sheet of the MDO film as defined herein may be sealed, preferably heat sealed, simultaneously at one part, such as at a first part, of the first and second sheet of the MDO film as defined herein, and at another part, such as at a second part, of the first and second sheet of the MDO film as defined herein. In certain embodiments, a first and second sheet of the MDO film as defined herein may be sealed, preferably heat sealed, sequentially at one part, such as at a first part, of the first and second sheet of the MDO film as defined herein, and at another part, such as at a second part, of the first and second sheet of the MDO film as defined herein.

In certain embodiments, a first and second sheet of the MDO film as defined herein may be sealed, preferably heat sealed, at one part, such as at a first part, of the first and second sheet of the MDO film as defined herein; a compressible product may be compressed in the sealed first and second sheet of the MDO film; and the package may be closed by sealing, preferably heat sealing, another part, such as a second part, of the first and second sheet of the MDO film as defined herein. This may happen during a primary packaging stage.

In certain embodiments, a first and second sheet of the MDO film as defined herein may be sealed, preferably heat sealed, at one part, such as at a first part, of the first and second sheet of the MDO film as defined herein; multiple packaged products, such as previously packaged mineral wool rolls or slabs, may be pushed and compressed in the sealed first and second sheet of the MDO film; and the package may be closed by sealing, preferably heat sealing, another part, such as a second part, of the first and second sheet of the MDO film as defined herein. This may happen during a secondary packaging stage.

In certain embodiments, a first and second sheet of the MDO film as defined herein may be sealed, preferably heat sealed, at one part, such as at a first part, of the first and second sheet of the MDO film as defined herein; multiple multipacks may be pushed and compressed in the sealed first and second sheet of the MDO film; and the package may be closed by sealing, preferably heat sealing, another part, such as a second part, of the first and second sheet of the MDO film as defined herein. This may happen during a tertiary packaging stage.

In certain embodiments, the MDO film as defined herein may be cut for instance during or after sealing. Cutting may be performed by a knife.

In certain embodiments, the MDO film as defined herein may be cut during sealing. In certain embodiments, a sealing station may comprise two sealing bars, i.e., a first sealing bar and a second sealing bar, and a knife between the first and second sealing bar. The sealing station may come down and the first sealing bar may seal the second part of a first package and at the same time the second sealing bar may seal the first part of the next or following package. At the same time, the knife which is in the middle of the two sealing bars may cut the MDO film as defined herein between the two seals.

In certain embodiments, the seal may have a seal elongation at failure of about 25% to about 100%, for instance, the seal may have a seal elongation at failure of about 25% to about 90%, of about 30% to about 90%, of about 35% to about 85%, of about 35% to about 80%, of about 35% to about 75%, of about 35% to about 70%, of about 35% to about 65%, of about 35% to about 60%, of about 35% to about 55%, of about 40% to about 80%, or of about 45% to about 75%, as measured in accordance with ASTM F88/F88M-09 as described herein. Such seal elongation at failure of about 25% to about 100% allows preparing a packaged compressible product in a compressed state which is able to resist the forces of the compressed product during storage and transportation thereof, and which is also able to withstand shocks and movements exerted on the packaged product during transportation thereof.

The term "seal elongation" or "seal elongation at failure", as used herein, refers to the percentage elongation at failure, as measured in accordance with the ASTM F88/F88M-09 standard, with tail holding technique A on a tensile testing machine. A sealed sample with a width of 15 mm is clamped between two grips with a distance of 50 mm and tested with a jaw separation speed of 250 mm/min. The tensile testing machine gives a curve of seal force versus grip travel. The mode of sample failure or test strip failure includes adhesive failure of the seal or adhesive peel; cohesive failure of the material; break or tear of material in seal area or at seal edge; delamination of surface layer(s) from substrate; elongation of material; and break or tear of material remote from seal (as illustrated in FIG. 4 of ASTM F88/F88M-09). Preferably, a sample to test the seal elongation is prepared in accordance with ASTM F2029-08, wherein the parts of the MDO film are sealed perpendicular to the machine direction of the film with a heat sealing equipment utilizing hot-bar jaws, and the conditions for heat sealing are set as follows: 1 sec. dwell time, 100 N sealing pressure, 5 mm jaw width and a sealing temperature of 160° C.

The seal elongation at failure generally refers to the percentage that a sealed film needs to be stretched between the grips of a tensile testing machine in order to observe failure. In order to determine the seal elongation at failure, the distance between the grips is gradually increased until the moment failure is determined. The seal elongation at failure may be calculated by dividing the extension of the sample at the moment of sample failure (i.e., grip travel at failure) by the initial length of the sample, and multiplying by 100.

The present method is used for packaging a compressible product in a compressed state.

The term "compressible product", as used herein, refers to any product or material which is capable of being compressed by the application of balanced inward (i.e., pushing or compressive) forces to different points on the product or material, and which is capable of reverting at least partly to its uncompressed state when the application of the balanced inward (i.e., pushing or compressive) forces is discontinued. The terms "product" or "material" may be used interchangeably herein.

The terms "compressible product in a compressed state" or "compressed product", as used herein, refer to a product or material wherein the size of the product or material is reduced in one or more directions, due to the application of balanced inward (i.e., pushing or compressive) forces to different points on the product or material. A compressible product in a compressed state will exert balanced outward (i.e., pulling) forces on the material which keeps the compressible product in a compressed state. When the material which keeps the compressible product in a compressed state is removed, the compressible product will revert at least partly to its uncompressed or non-compressed state. For instance, a compressible product, such as a mineral wool product, in a compressed state will exert balanced outward (i.e., pulling) forces on the MDO film as defined herein (and by extension on the seal prepared by sealing the MDO film as defined herein) which keeps the compressible product in a compressed state. When the MDO film as defined herein is removed, the compressible product will revert at least partly to its uncompressed or non-compressed state.

In certain embodiments, the compressive forces on the product may be directed along one direction only (i.e., uniaxial compression), so that they act towards decreasing the length of the product along that direction. The compressive forces may also be applied in multiple directions; for example inwards along the edges of a plate or all over the side surface of a cylinder, so as to reduce its area (i.e., biaxial compression), or inwards over the entire surface of a body, so as to reduce its volume.

In certain embodiments, the length, area, or volume of a compressible product in a compressed state (e.g., due to the application of inward forces on the product) may be reduced by at least about 1% relative to (i.e., compared with) respective reference value(s) representing the length, area, or volume of the compressible product in an uncompressed state (e.g., without the application of any forces on the product). For example, the length, area, or volume of a compressible product in a compressed state (e.g., due to the application of inward forces on the product) may be reduced by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, or at least about 80% relative to (i.e., compared with) respective reference value(s) representing the length, area, or volume of the compressible product in an uncompressed state (e.g., without the application of any inward forces on the product). Such reduction in the length, area, or volume of the compressible product advantageously allows to store and transport to compressible product in an efficient and hence, economical manner.

A further aspect relates to a compressible product in a compressed state packaged in a polymeric MDO film which encloses at least part of the compressible product, wherein at least two parts of the MDO film are sealed, and characterised in that the seal has a seal elongation at failure of about 20% to about 100%, as measured in accordance with ASTM F88/F88M-09.

The wordings "compressible product in a compressed state packaged in an MDO film", "packaged product", or "packaged compressible product" may be used interchangeably herein.

In certain embodiments, the packaged product may comprise a compressible product in a compressed state and a polymeric MDO film which encloses at least part of the compressible product in the compressed state, wherein at least two parts of the MDO film are sealed (so as to keep the compressible product in a compressed state), and characterised in that the seal has a seal elongation at failure of about 20% to about 100%, as measured in accordance with ASTM F88/F88M-09.

In certain embodiments, the packaged product may comprise a compressible product in a compressed state and a polymeric MDO film, wherein the MDO film encloses at least part of the compressible product in the compressed state and at least two parts of the MDO film are sealed (so as to keep the compressible product in a compressed state), and characterised in that the seal has a seal elongation at failure of about 20% to about 100%, as measured in accordance with ASTM F88/F88M-09.

In certain embodiments, when the compressible product, such as a mineral wool product, is a roll, one sheet of MDO film as defined herein may enclose at least part of the cylindrical outer surface of the roll.

In certain embodiments, when the compressible product, such as a mineral wool product, is a slab (or plate) or a pile of slabs (or plates), one sheet of the MDO film as defined herein may enclose at least part of the upper and the lower surface of the slab (or plate) or pile of slabs (or plates). Alternatively, in certain embodiments, when the compressible product, such as a mineral wool product, is a slab (or plate) or a pile of slabs (or plates), one sheet of the MDO film as defined herein (i.e., the upper or first sheet of MDO film) may enclose at least part of the upper surface of the slab (or plate) or pile of slabs (or plates) and another sheet of the MDO film as defined herein (i.e., the lower or second sheet of MDO film) may enclose at least part of the lower surface of the slab (or plate) or pile of slabs (or plates).

In certain embodiments, at least two packaged products as defined herein may be further packaged in a compressed state in an MDO film as defined herein. For instance, at least three, at least four, at least five, at least six, at least seven at least eight, at least nine, at least ten, at least eleven, or at least twelve packaged products as defined herein may be further packaged in a compressed state in an MDO film as defined herein.

The term "multipack", as used herein refers, to a package comprising at least two packaged products, such as mineral wool rolls or slabs, packaged in a compressed state in an MDO film as defined herein. For example, a multipack comprises at least three, at least four, at least five, at least six, at least seven at least eight, at least nine, at least ten, at least eleven, or at least twelve packaged products, such as mineral wool rolls or slabs, packaged in a compressed state in an MDO film as defined herein.

In certain embodiments, at least two multipacks as defined herein may be further packaged in a compressed state in an MDO film as defined herein. For instance, at least three, at least four, at least five, at least six, at least seven at least eight, at least nine, at least ten, at least eleven, or at least twelve multipacks as defined herein may be further packaged in a compressed state in an MDO film as defined herein.

The term "arrangement", as used herein refers, to a package comprising at least two multipacks packaged in a compressed state in an MDO film as defined herein. For example, an arrangement comprises at least three, at least four, at least five, at least six, at least seven at least eight, at least nine, at least ten, at least eleven, or at least twelve multipacks packaged in a compressed state in an MDO film as defined herein.

In certain embodiments, when the compressible product is a multipack, one sheet of the MDO film as defined herein may enclose at least part of the upper and the lower surface of the pile of multipacks. Alternatively, in certain embodiments, when the compressible product is a multipack, one sheet of the MDO film as defined herein (i.e., the upper or first sheet of MDO film) may enclose at least part of the upper surface of the pile of multipacks and another sheet of the MDO film as defined herein (i.e., the lower or second sheet of MDO film) may enclose at least part of the lower surface of pile of multipacks.

In certain embodiments, the packaged products, multipacks, or arrangements, as taught herein, may be stacked next to each other on a base member. Since the packaged products, multipacks, or arrangements as taught herein have reduced dimensions, they advantageously allow optimizing the number of packaged products, multipacks, or arrangements that can be stacked next to each other on a base member, such as a pallet. Such optimization advantageously allows increasing the efficiency of internal and external storage and/or transport of the compressible product, and thereby reducing the cost of storage and/or transport.

The term "base member", as used herein, refers to a member on which other elements, such as the compressible products packaged in a compressed state rest or are supported. Preferably, the base member is a pallet. Dimensions of pallets are standardized and known in the art. For instance, a "European" pallet, named europallet, has dimensions of 1200 mm×800 mm and advantageously fits standard doorways.

In certain embodiments of the methods, uses, or packaged products, as taught herein, the compressible product may be an insulation product.

The terms "insulation product" or "insulation material" may be used interchangeably herein and refer to a product or material capable of reducing or preventing the transfer, flow, or conduct of heat, sound, or electricity.

In certain embodiments of the methods, uses, or packaged products, as taught herein, the insulation product may be building insulation, acoustic insulation, thermal insulation, or electrical insulation.

In certain embodiments of the methods, uses, or packaged products, as taught herein, the compressible product, in particular the insulation product, may be a mineral wool product, such as a mineral wool slab or a mineral wool roll.

The term "mineral wool" generally refers to fibres made from natural or synthetic minerals. Non-limiting examples of synthetic minerals are fibreglass or glass wool; ceramic fibres; and stone wool or rock wool. The terms "mineral wool", "mineral fibres", or "man-made mineral fibres" may be used interchangeably.

In certain embodiments of the methods, uses, or packaged products, as taught herein, the compressible material may be a glass wool product and/or a rock wool product.

A further aspect relates to a polymeric MDO film for packaging a compressible product in a compressed state, characterised in that the MDO film, when at least two parts of the MDO film are sealed, provides a seal with a seal elongation at failure of about 20% to about 100%, as measured in accordance with ASTM F88/F88M-09. In other words, an aspect relates to a polymeric MDO film for packaging a compressible product in a compressed state, wherein, when at least two parts of the MDO film are sealed, the seal has a seal elongation at failure of about 20% to about 100%, as measured in accordance with ASTM F88/F88M-09.

The term "film", as used herein, is meant to encompass any film used for packaging applications of compressible products in a compressed state.

The term "machine direction oriented film" or "MDO film", as used herein, refers to a film which has been oriented in the machine direction.

In certain embodiments of the MDO films, methods, uses, or packaged products, as taught herein, the MDO film may be oriented only in the machine direction (i.e., longitudinal direction). In certain embodiments, the MDO film may be oriented in the longitudinal or machine direction and in the transverse direction. In certain preferred embodiments, the MDO film may be oriented in the longitudinal or machine direction. Preferably, the MDO film is a mono-oriented film. Such MDO films result in better sealing properties.

In certain embodiments, the MDO film may be mono-oriented.

The term "mono-oriented film" generally refers to a film which has been stretched in the machine direction (i.e., longitudinal direction) by means of a Machine Direction Orienter (MDO) unit in or out of line with the extrusion process. Typically orienting is achieved by passing the film between two or more drawing rolls which rotate at different speed, such as a pair of drawing rolls in which one roll rotates at a higher speed than the other. In certain embodiments, the MDO film may be stretched in two or more steps using two or more stretching units. The oriented film may subsequently be relaxed in a relaxation unit.

In certain embodiments, the MDO film may be prepared by stretching or orienting a film in the machine direction with a stretching ratio of about 1:1.5 to about 1:4.

As used herein, the term "stretching ratio" means the ratio of the total film length before stretching to the total film length after stretching. Thus, a stretching ratio of 1:2 means that the film has been stretched by 100% of its length before said stretching. Regarding thickness of the film, this means that a 120 μm film is draw down to 60 μm.

In certain embodiment, the MDO film may be prepared by stretching or orienting a film in the machine direction with a stretching ratio of about 1:1.5 to about 1:3.5, for instance with a stretching ratio of about 1:2 to about 1:3.5, of about 1:2.5 to about 1:3.5, or of about 1:2.5 to about 1:3.

The MDO film as taught herein may be prepared by a variety of processes. The MDO film as taught herein film may be prepared by co-extrusion, coating, or other laminating processes. The MDO film as taught herein may be prepared by casting or blown film processes. After the preparation of the film, the resulting film may be stretched to obtain an MDO film as defined herein, such as a mono-oriented MDO film.

Preferably, the MDO film as taught herein film is prepared by co-extrusion. Preferably, the MDO film as taught herein film is a blown film. Preferably, MDO film as taught herein film is produced by means of blown film extrusion. It is also possible to produce MDO film as taught herein by means of cast film extrusion.

A mono-oriented film is typically prepared as follows. After the preparation of the starting film, the film may be uniaxially stretched or oriented in the machine direction to a thinner mono-oriented film. During this machine direction orientation, the film such as a multilayer film from the blown-film line or other film process may be heated to an orientation temperature. The heating is preferably performed utilizing multiple heated rollers. The heated film may be fed into a slow drawing roll with a nip roller, which has a similar rolling speed as the heated rollers. The film may then enter a fast drawing roll which has a speed that is 1.1 to 10 times faster than the slow draw roll, which effectively orients the film on a continuous basis. The mono-oriented film may be annealed by holding the film at an elevated temperature during a limited period of time to allow stress relaxation. Finally, the mono-oriented film may be cooled down by contacting the film with rollers at ambient temperature and may be winded to a reel.

In certain embodiments of the methods, uses, packaged products, or MDO films, as taught herein, the MDO film as defined herein may have a tensile creep in the machine direction of about 0.10% to about 0.50% per μm thickness of the film, as measured in accordance with ISO 899-1-2003. In certain embodiments of the methods, uses, packaged products, or MDO films, as taught herein, the MDO film as defined herein may have a tensile creep in the machine direction of about 0.10% to about 0.50% per μm thickness of the film, as measured in accordance with ISO 899-1-2003 with following conditions: sample width of 15 mm, grip distance of 100 mm, a load of 2300 g, for 24 hours, and at 23° C. Such tensile creep allows packaging a compressible product in a highly compressed state and to store and/or transport the packaged product with a limited size, diameter, or volume in an efficient and economical way.

The tensile creep generally refers to the change in the distance between the grips, relative to the initial distance, produced by the applied load at any given time during a creep test, expressed as a percentage. In order to determine the tensile creep, the increase in the distance between the clamp grips under load is measured.

The term "tensile creep" as used herein refers to the nominal tensile-creep strain, as measured in accordance with the ISO 899-1:2003 standard. The sample with a width of 15 mm is clamped between two grips with a distance of 100 mm and loaded with a load of 2300 g during 24 hours at 23° C. The tensile creep test consists of measuring the extension of a specimen subject to a constant load of 2.3 kg at 23° for 24 hours.

In certain embodiments, the MDO film as defined herein may have a tensile creep in the machine direction of about 0.10% to about 0.45% per μm thickness of the film, about 0.10% to about 0.40% per μm thickness of the film, about 0.15% to about 0.40% per μm thickness of the film, or about 0.15% to about 0.35% per μm thickness of the film, as measured in accordance with ISO 899-1-2003, preferably with following conditions: sample width of 15 mm, grip distance of 100 mm, a load of 2300 g, for 24 hours, and at 23° C. Such a tensile creep allows packaging a compressible product in a compressed state to get a packaged product with a limited size, diameter, or volume which can be efficiently stored and transported.

In certain embodiments of the methods, uses, packaged products, or MDO films, as taught herein, the MDO film as defined herein may have a thickness of about 15 µm to about 100 µm. In certain embodiments, the MDO film as defined herein may have a thickness of about 15 µm to about 95 µm, about 20 µm to about 95 µm, about 25 µm to about 95 µm, about 30 µm to about 95 µm, about 40 µm to about 90 µm, about 45 µm to about 85 µm, about 50 to about 80 µm, or about 60 µm to about 70 µm. Films with such a thickness are advantageous for economical and ecological reasons. Fewer raw materials are required to produce such films. Also, such thinner films advantageously allow complying with certain ecological requirements. Using thinner films may also reduce the costs to cope with the generated waste.

The term "thickness", as used herein, refers to the thickness of the MDO film after the orientation of the film in the machine direction.

In certain embodiments of the methods, uses, packaged products, or MDO films, as taught herein, the MDO film as defined herein may have an elongation at break in the machine direction of about 100% to about 300%, as measured in accordance with ASTM D882. In certain embodiments, the MDO film as defined herein may have an elongation at break in the machine direction of about 100% to about 300%, of about 100% to about 250%, or of about 150% to about 250%, as measured in accordance with ASTM D882. Such an elongation at break provides satisfactory sealing properties to the MDO film. Such an elongation at break also allows that the MDO film can be sealed without the continuous need to adjust and adapt the sealing bars by aligning them.

The term "elongation at break" or "elongation capability", as used herein, refers to the percentage of elongation until break, measured in accordance with the ASTM D882 standard, in which a strip of film (in the longitudinal direction) with a width of 15 mm is clamped between two clamps situated at a distance of 50 mm from each other, and the film is subsequently stretched at a rate of 500 mm/min until the film breaks or tears. At least five strips of the film must be tested. The mean value of the measurements indicates the elongation capability or elongation at break. Preferably, the elongation at break is measured in accordance with ASTM D882-12.

In certain embodiments, the MDO film may be produced by stretching or orienting a film in the machine direction with a stretching ratio of about 1:1.5 to about 1:4, so that the MDO film has an elongation at break in the machine direction of about 100% to about 300%, as measured in accordance with ASTM D882. For instance, the MDO film may be produced by stretching or orienting a film in the machine direction with a stretching ratio of about 1:1.5 to about 1:4, of about 1:1.5 to about 1:3.5, of about 1:2 to about 1:3.5, of about 1:2.5 to about 1:3.5, or of about 1:2.5 to about 1:3, so that the MDO film has an elongation at break in the machine direction of about 100% to about 300%, of about 100% to about 250%, or of about 150% to about 250%, as measured in accordance with ASTM D882. Such MDO films provide satisfactory sealing properties when sealing the MDO film. Such MDO films allow improved sealing of at least two parts of the MDO film without the continuous need to adjust the sealing bars by aligning them.

In certain embodiments of the methods, uses, packaged products, or MDO films, as taught herein, the MDO film may comprise one or more, such as two or more, three or more, four or more, five or more, six or more, seven or more, eight or more, nine or more, ten or more, eleven or more, twelve or more, thirteen or more, or fourteen or more layers. In certain embodiments, the MDO film may be a multilayer film. Such an MDO film advantageously has good sealing properties.

In certain embodiments, the MDO film may comprise at least two layers. In certain embodiments, the MDO film may comprise at least three, at least four, at least five, at least six, at least seven, at least eight, at least nine, at least ten, at least eleven, at least twelve, at least thirteen, or at least fourteen layers. In certain embodiments, the MDO film may comprise at least two layers joined to one another. In certain embodiments, the MDO film may comprise at least three, at least four, at least five, at least six, at least seven, at least eight, at least nine, at least ten, at least eleven, at least twelve, at least thirteen, or at least fourteen layers joined to one another.

The term "polymeric" refers to a film comprising at least one polymer such as a polyolefin.

In certain embodiments, the MDO film as defined herein may be substantially made of polyolefin. The term "polyolefin" generally refers to homopolymers, or copolymers having a methylene linkage between monomer units which may be formed by any method known to those skilled in the art. Examples of polyolefins broadly includes polymers such as polyethylene and ethylene copolymers having a small amount of a copolymer such as ethylene-alpha olefin copolymers (LLDPE), polypropylene, polybutene, and other polymeric resins falling in the "olefin" family classification, polyethylene (PE), low density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (UHDPE), ethylene/propylene copolymers, polypropylene (PP), propylene/ethylene copolymer, polyisoprene, polybutylene, polybutene, poly-3-methylbutene-1, poly-4-methylpentene-1, or copolymers of ethylene with one or more alpha-olefins such as butene-1, hexene-1 or octene-1.

In certain embodiments, the MDO film as defined herein may comprise LLDPE and/or mLLDPE and/or plastomers. LLDPE and/or mLLDPE and/or plastomers allow preparing an MDO film with satisfactory sealing properties.

The term "linear low density polyethylene" or "LLDPE" refers to a substantially linear polymer, with (significant numbers of) short branches, typically made by copolymerization of ethylene with longer-chain olefins such as 1-butene, 1-hexene, and 1-octene. LLDPE generally has a density lower than 942 kg/m$^3$, preferably lower than 930 kg/m$^3$.

The term "metallocene linear low density polyethylene" or "mLLDPE" refers to LLDPE produced in the presence of a metallocene catalyst.

The term "plastomer" generally refers to a polymer material which combines qualities of elastomers and plastics. Suitable non-limiting examples of plastomers are ethylene-alpha olefin copolymers. Commercially available plastomers include Affinity® produced by Dow, Queo® produced by *Borealis*, Lucene® produced by LG Chem and others.

In certain embodiments, the MDO film may comprise from about 10% to about 99% by weight of LLDPE and/or mLLDPE and/or plastomers, with % by weight relative to (i.e., compared with) the total weight of the MDO film as taught herein. For instance, the MDO film may comprise from about 15% to about 95%, from about 20% to about 90%, from about 25% to about 85%, from about 30% to about 80%, from about 35% to about 70%, or from about 40% to about 60% by weight of LLDPE and/or mLLDPE and/or plastomers, with % by weight relative to (i.e., compared with) the total weight of the MDO film as taught herein.

In certain embodiments of the methods, uses, packaged products, or MDO films, as taught herein, the MDO film as defined herein comprises one or more polymers selected from the group consisting of high density polyethylene (HDPE), medium density polyethylene (MDPE), polypropylene (PP), cyclic olefin copolymer (COC), and styrene butadiene copolymer (SBC). Such polymers advantageously allow increasing the stiffness of the MDO film as taught herein.

The term "high density polyethylene" or "HDPE", as used herein, refers to polyethylene with a density of about 941 kg/m$^3$ to about 970 kg/m$^3$. Preferably, HDPE has a density of about 945 kg/m$^3$ to about 965 kg/m$^3$. HDPE may be prepared by the polymerization of ethylene monomers and optionally longer-chain olefins such as 1-hexene.

In certain embodiments, the HDPE may be metallocene high density polyethylene (mHDPE).

The term "metallocene high density polyethylene" or "mHDPE" refers to HDPE produced in the presence of a metallocene catalyst.

The term "medium density polyethylene" or "MDPE" refers to polyethylene with a density of about 926 kg/m$^3$ to about 940 kg/m$^3$. MDPE may be prepared by the polymerization of ethylene monomers and optionally longer-chain olefins such as 1-hexene.

In certain embodiments, the MDPE may be metallocene medium density polyethylene (mMDPE).

The term "metallocene medium density polyethylene" or "mMDPE" refers to MDPE produced in the presence of a metallocene catalyst.

The term "polypropylene" or "PP" refers to a polymer of propylene. Suitable polypropylene includes homopolymer polypropylene, random copolymer polypropylene, and heterophasic block copolymer.

The term "cyclic olefin copolymer" or "COC" refers to a copolymer of ethylene with a cyclic monomer (such as norbornene), or to a polymer of cyclic monomers. Cyclic olefin copolymers using a single type of cyclic monomer are also referred to as cyclic olefin polymers (COP).

Cyclic olefin copolymers can be produced by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethylene (such as TOPAS® produced by TOPAS Advanced Polymer, or APEL™ produced by Mitsui Chemical), or by ring-opening metathesis polymerization of various cyclic monomers followed by hydrogenation (such as ARTON produced by Japan Synthetic Rubber, or Zeonex® and Zeonor® produced by Zeon Chemical).

The term "styrene butadiene copolymer" or "SBC" refers to a copolymer of styrene and butadiene. A suitable non-limiting example of a SBC is K-Resin® SBC supplied by Chevron Phillips.

In certain embodiments of the methods, uses, packaged products, or MDO films, as taught herein, the MDO film as defined herein may comprises from about 1% to about 90% by weight of one or more polymers selected from the group consisting of HDPE, MDPE, PP, COC, and SBC, with % by weight compared with the total weight of the MDO film as taught herein. For instance, the MDO film may comprise from about 5% to about 90%, from about 5% to about 85%, from about 10% to about 80%, from about 15% to about 75%, from about 20% to about 70%, from about 25% to about 65%, from about 30% to about 60%, or from about 40% to about 60% by weight of one or more polymers selected from HDPE, MDPE, PP, COC, and SBC, with % by weight relative to (i.e., compared with) the total weight of the MDO film as taught herein. For instance, the MDO film may comprise at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, or at least about 30% by weight of one or more polymers selected from HDPE, MDPE, PP, COC, and SBC, with % by weight relative to (i.e., compared with) the total weight of the MDO film as taught herein.

In certain embodiments, the MDO film as defined herein may comprise from about 1% to about 90% by weight of HDPE and/or mHDPE, with % by weight compared with the total weight of the MDO film. In certain embodiments, the MDO film may comprise from about 5% to about 90%, from about 5% to about 85%, from about 10% to about 80%, from about 15% to about 75%, from about 20% to about 70%, from about 25% to about 60%, or from about 30% to about 50% by weight of HDPE and/or mHDPE, with % by weight relative to (i.e., compared with) the total weight of the MDO film.

In certain embodiments, the MDO film as defined herein may comprise from about 1% to about 90% by weight of MDPE and/or mMDPE, with % by weight compared with the total weight of the MDO film. In certain embodiments, the MDO film may comprise from about 5% to about 90%, from about 5% to about 85%, from about 10% to about 80%, from about 15% to about 75%, from about 20% to about 70%, from about 25% to about 65%, from about 30% to about 60%, or from about 40% to about 60% by weight of MDPE and/or mMDPE, with % by weight relative to (i.e., compared with) the total weight of the MDO film.

In certain embodiments, the MDO film as defined herein comprises from about 1% to about 90% by weight of PP, with % by weight compared with the total weight of the MDO film. For instance, the MDO film may comprise from about 5% to about 90%, from about 5% to about 85%, from about 10% to about 80%, from about 15% to about 75%, from about 20% to about 70%, from about 25% to about 60%, or from about 30% to about 50% by weight of PP, with % by weight relative to (i.e., compared with) the total weight of the MDO film.

In certain embodiments, the MDO film as defined herein comprises from about 1% to about 90% by weight of COC, with % by weight relative to (i.e., compared with) the total weight of the MDO film. For instance, the MDO film may comprise from about 5% to about 90%, from about 5% to about 85%, from about 10% to about 80%, from about 15% to about 75%, from about 20% to about 70%, from about 25% to about 60%, from about 30% to about 50% by weight of COC, with % by weight relative to (i.e., compared with) the total weight of the MDO film. For instance, the MDO film may comprise from about 1% to about 25%, from about 1% to about 20%, from about 1% to about 15%, from about 1% to about 10%, from about 5% to about 25%, or from about 10% to about 25% by weight of COC, with % by weight relative to (i.e., compared with) the total weight of the MDO film.

In certain embodiments, the MDO film as defined herein comprises from about 1% to about 90% by weight of SBC, with % by weight relative to (i.e., compared with) the total weight of the MDO film. For instance, the MDO film may comprise from about 5% to about 90%, from about 5% to about 85%, from about 10% to about 80%, from about 15% to about 75%, from about 20% to about 70%, from about 25% to about 60%, from about 30% to about 50% by weight of SBC, with % by weight relative to (i.e., compared with) the total weight of the MDO film. For instance, the MDO film may comprise from about 1% to about 25%, from about 1% to about 20%, from about 1% to about 15%, from about 1% to about 10%, from about 5% to about 25%, or from about 10% to about 25% by weight of SBC, with % by weight relative to (i.e., compared with) the total weight of the MDO film.

In certain embodiments, the MDO film as defined herein may comprise linear low density polyethylene (LLDPE) and/or metallocene linear low density polyethylene (mLLDPE) and/or plastomers, and one or more polymers selected from the group consisting of high density polyethylene (HDPE), medium density polyethylene (MDPE), polypropylene (PP), cyclic olefin copolymer (COC), and styrene butadiene copolymer (SBC).

In certain embodiments, the MDO film as defined herein may comprise from about 10% to about 99% by weight of LLDPE and/or mLLDPE and/or plastomers, and from about 1% to about 90% by weight of one or more polymers selected from the group consisting of HDPE, MDPE, PP, COC, and SBC, with % by weight relative to (i.e., compared with) the total weight of the MDO film. For instance, the MDO film as defined herein may comprise from about 10% to about 99%, from about 15% to about 95%, from about 20% to about 90%, from about 25% to about 85%, from about 30% to about 80%, from about 35% to about 70%, or from about 40% to about 60% by weight of LLDPE and/or mLLDPE and/or plastomers, and from about 1% to about 90%, from about 5% to about 90%, from about 5% to about 85%, from about 10% to about 80%, from about 15% to about 75%, from about 20% to about 70%, from about 25% to about 65%, from about 30% to about 60%, or from about 40% to about 60% by weight of one or more polymers selected from the group consisting of HDPE, MDPE, PP, COC, and SBC, with % by weight relative to (i.e., compared with) the total weight of the MDO film as taught herein.

In certain preferred embodiments, the MDO film as defined herein may comprise from about 10% to about 99%, from about 15% to about 95%, from about 20% to about 90%, from about 25% to about 85%, from about 30% to about 80%, from about 35% to about 70%, or from about 40% to about 60% by weight of LLDPE and/or mLLDPE and/or plastomers, and from about 1% to about 90%, from about 5% to about 90%, from about 5% to about 85%, from about 10% to about 80%, from about 15% to about 75%, from about 20% to about 70%, from about 25% to about 60%, or from about 30% to about 50% by weight of HDPE and/or mHDPE, with % by weight relative to (i.e., compared with) the total weight of the MDO film.

In certain preferred embodiments, the MDO film as defined herein may comprise from about 10% to about 99%, from about 15% to about 95%, from about 20% to about 90%, from about 25% to about 85%, from about 30% to about 80%, from about 35% to about 70%, or from about 40% to about 60% by weight of LLDPE and/or mLLDPE and/or plastomers, and from about 1% to about 90%, from about 5% to about 90%, from about 5% to about 85%, from about 10% to about 80%, from about 15% to about 75%, from about 20% to about 70%, from about 25% to about 65%, from about 30% to about 60%, or from about 40% to about 60% by weight of MDPE and/or mMDPE, with % by weight relative to (i.e., compared with) the total weight of the MDO film.

In certain preferred embodiments, the MDO film as defined herein may comprise from about 10% to about 99%, from about 15% to about 95%, from about 20% to about 90%, from about 25% to about 85%, from about 30% to about 80%, from about 35% to about 70%, or from about 40% to about 60% by weight of LLDPE and/or mLLDPE and/or plastomers, and from about 1% to about 90%, from about 5% to about 90%, from about 5% to about 85%, from about 10% to about 80%, from about 15% to about 75%, from about 20% to about 70%, from about 25% to about 60%, or from about 30% to about 50% by weight of PP, with % by weight relative to (i.e., compared with) the total weight of the MDO film.

In certain preferred embodiments, the MDO film as defined herein may comprise from about 10% to about 99%, from about 15% to about 95%, from about 20% to about 90%, from about 25% to about 85%, from about 30% to about 80%, from about 35% to about 70%, or from about 40% to about 60% by weight of LLDPE and/or mLLDPE and/or plastomers, and from about 1% to about 90%, from about 5% to about 90%, from about 5% to about 85%, from about 10% to about 80%, from about 15% to about 75%, from about 20% to about 70%, from about 25% to about 60%, from about 30% to about 50% by weight of COC, with % by weight relative to (i.e., compared with) the total weight of the MDO film. In certain preferred embodiments, the MDO film as defined herein may comprise from about 10% to about 99%, from about 15% to about 95%, from about 20% to about 90%, from about 25% to about 85%, from about 30% to about 80%, from about 35% to about 70%, or from about 40% to about 60% by weight of LLDPE and/or mLLDPE and/or plastomers, and from about 1% to about 25%, from about 1% to about 20%, from about 1% to about 15%, from about 1% to about 10%, from about 5% to about 25%, or from about 10% to about 25% by weight of COC, with % by weight relative to (i.e., compared with) the total weight of the MDO film.

In certain preferred embodiments, the MDO film as defined herein may comprise from about 10% to about 99%, from about 15% to about 95%, from about 20% to about 90%, from about 25% to about 85%, from about 30% to about 80%, from about 35% to about 70%, or from about 40% to about 60% by weight of LLDPE and/or mLLDPE and/or plastomers, and from about 1% to about 90%, from about 5% to about 90%, from about 5% to about 85%, from about 10% to about 80%, from about 15% to about 75%, from about 20% to about 70%, from about 25% to about 60%, from about 30% to about 50% by weight of SBC, with % by weight relative to (i.e., compared with) the total weight of the MDO film. In certain preferred embodiments, the MDO film as defined herein may comprise from about 10% to about 99%, from about 15% to about 95%, from about 20% to about 90%, from about 25% to about 85%, from about 30% to about 80%, from about 35% to about 70%, or from about 40% to about 60% by weight of LLDPE and/or mLLDPE and/or plastomers, and from about 1% to about 25%, from about 1% to about 20%, from about 1% to about 15%, from about 1% to about 10%, from about 5% to about 25%, or from about 10% to about 25% by weight of SBC, with % by weight relative to (i.e., compared with) the total weight of the MDO film.

In certain embodiments of the methods, uses, packaged products, or MDO films, as taught herein, the MDO film as defined herein may have an elongation at break in the machine direction of about 100% to about 300%, as measured in accordance with ASTM D882, and may comprise one or more polymers selected from the group consisting of HDPE, MDPE, PP, COC, and SBC. Such an MDO film allows packaging a compressible product in a highly compressed state for storage and/or transportation thereof, and the resulting packaged product is able to withstand expansion forces of the compressed product and to resist movements and shocks associated with transporting the packaged product without popping open.

In certain embodiments of the methods, uses, packaged products, or MDO films, as taught herein, the MDO film may have an elongation at break in the machine direction of about 100% to about 300%, as measured in accordance with ASTM D882, and the MDO film may comprise from about 1% to about 90% by weight of one or more polymers selected from the group consisting of HDPE, MDPE, PP, COC, and SBC, with % by weight relative to (i.e., compared with) the total weight of the MDO film. For instance, the MDO film may have an elongation at break in the machine direction of about 100% to about 300%, of about 100% to about 250%, or of about 150% to about 250%, as measured in accordance with ASTM D882, and the MDO film may comprise from about 1% to about 90%, from about 5% to about 90%, from about 5% to about 85%, from about 10% to about 80%, from about 15% to about 75%, from about 20% to about 70%, from about 25% to about 65%, from about 30% to about 60%, or from about 40% to about 60% by weight of one or more polymers selected from the group consisting of HDPE, MDPE, PP, COC, and SBC, with % by weight relative to (i.e., compared with) the total weight of the MDO film.

In certain embodiments, the MDO film may have an elongation at break in the machine direction of about 100% to about 300%, of about 100% to about 250%, or of about 150% to about 250%, as measured in accordance with ASTM D882, and the MDO film may comprise at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, or at least about 30% by weight of one or more polymers selected from HDPE, MDPE, PP, COC, and SBC, with % by weight relative to (i.e., compared with) the total weight of the MDO film as taught herein.

In certain embodiments of the methods, uses, packaged products, or MDO films, as taught herein, the MDO film may be produced by stretching or orienting a film in the machine direction with a stretching ratio of about 1:1.5 to about 1:4, so that the MDO film has an elongation at break in the machine direction of about 100% to about 300%, as measured in accordance with ASTM D882, and the MDO film may comprise one or more polymers selected from the group consisting of HDPE, MDPE, PP, COC, and SBC. Such an MDO film has satisfying heat sealing properties and allows packaging a compressible product in a compressed state by sealing at least two parts of the MDO film without the need to adapt the heat sealing bars on a packaging line. Furthermore, a seal prepared with the present MDO film is able to withstand expansion forces of the compressed product and is able to withstand movements and shocks associated with transporting the packaged product. At the same time, the present MDO film allows to package a compressible product in a highly compressed state and to store and/or transport the packaged product with a limited size, diameter, or volume in an efficient and economical way.

In certain embodiments of the methods, uses, packaged products, or MDO films, as taught herein, the MDO film may be produced by stretching or orienting a film in the machine direction with a stretching ratio of about 1:1.5 to about 1:4, so that the MDO film has an elongation at break in the machine direction of about 100% to about 300%, as measured in accordance with ASTM D882, and the MDO film may comprise from about 1% to about 90% by weight of one or more polymers selected from the group consisting of HDPE, MDPE, PP, COC, and SBC, with % by weight relative to (i.e., compared with) the total weight of the MDO film. For instance, the MDO film may be produced by stretching or orienting a film in the machine direction with a stretching ratio of about 1:1.5 to about 1:4, of about 1:1.5 to about 1:3.5, of about 1:2 to about 1:3.5, of about 1:2.5 to about 1:3.5, or of about 1:2.5 to about 1:3, so that the MDO film has an elongation at break in the machine direction of about 100% to about 300%, of about 100% to about 250%, or of about 150% to about 250%, as measured in accordance with ASTM D882, and the MDO film may comprise from about 1% to about 90%, from about 5% to about 90%, from about 5% to about 85%, from about 10% to about 80%, from about 15% to about 75%, from about 20% to about 70%, from about 25% to about 65%, from about 30% to about 60%, or from about 40% to about 60% by weight of one or more polymers selected from the group consisting of HDPE, MDPE, PP, COC, and SBC, with % by weight relative to (i.e., compared with) the total weight of the MDO film.

In certain embodiments, the MDO film may be produced by stretching or orienting a film in the machine direction with a stretching ratio of about 1:1.5 to about 1:4, of about 1:1.5 to about 1:3.5, of about 1:2 to about 1:3.5, of about 1:2.5 to about 1:3.5, or of about 1:2.5 to about 1:3, so that the MDO film has an elongation at break in the machine direction of about 100% to about 300%, of about 100% to about 250%, or of about 150% to about 250%, as measured in accordance with ASTM D882, and the MDO film may comprise at least about 1%, at least about 2%, at least about 3%, at least about 4%, at least about 5%, at least about 6%, at least about 7%, at least about 8%, at least about 9%, at least about 10%, at least about 15%, at least about 20%, at least about 25%, or at least about 30% by weight of one or more polymers selected from HDPE, MDPE, PP, COC, and SBC, with % by weight relative to (i.e., compared with) the total weight of the MDO film as taught herein.

In certain embodiments, the MDO film as defined herein may further comprise ethylene vinyl acetate (EVA), ethylene methyl acetate (EMA), or ethylene butyl acetate (EBA). EVA, EMA, or EBA allow forming a multilayer film.

In certain embodiments, the MDO film as defined herein may further comprise one or more additives selected from the group consisting of UV-stabilizers (like hindered amine light stabilizers (HALS) and others), pigments (like $TiO_2$ and other colour pigments), and fillers (like $CaCO_3$, talc, and others).

In certain embodiments, the MDO film as defined herein may be prepared from a film with m layers by blocking the film in the nip rollers to a film with 2 times m (i.e., 2×m) layers, wherein m may be two or more, such as m may be two, three, four, five, six, or seven.

In certain embodiments, the MDO film as defined herein may be prepared from a film with at least an outer layer and an inner layer, wherein the film is blocked in the nip rollers to form a film with at least an outer layer, an inner layer, an inner layer, and an outer layer.

In certain embodiments, the MDO film as defined herein may be prepared from a film with at least an outer layer, a core layer, and an inner layer, wherein the film is blocked in the nip rollers to form a film with at least an outer layer, a core layer, an inner layer, an inner layer, a core layer, and an outer layer.

In certain embodiments, the MDO film as defined herein may be prepared from a film with three layers comprising an outer layer, a core layer, and an inner layer, wherein the film is blocked in the nip rollers to a film with six layers.

In certain embodiments, the outer layer may comprise LLDPE and/or mLLDPE and/or plastomers. The outer layer allows sealing at least two parts of the MDO film as defined herein.

In certain embodiments, the core layer may comprise one or more polymers selected from the group consisting of HDPE, MDPE, PP, COC, and SBC. In certain embodiments, the core layer may comprise LLDPE and/or mLLDPE and/or plastomers and one or more polymers selected from the group consisting of HDPE, MDPE, PP, COC, and SBC. The core layer advantageously provides stiffness to the MDO film as defined herein.

In certain embodiments of the methods, uses, packaged products, or MDO films, as taught herein, the core layer of the MDO film as defined herein may comprises from about 1% to about 90% by weight of one or more polymers selected from the group consisting of HDPE, MDPE, PP, COC, and SBC, with % by weight compared with the total weight of the MDO film as taught herein. For instance, the core layer of the MDO film as defined herein may comprise from about 5% to about 90%, from about 5% to about 85%, from about 10% to about 80%, from about 15% to about 75%, from about 20% to about 70%, from about 25% to about 65%, from about 30% to about 60%, or from about 40% to about 60% by weight of one or more polymers selected from HDPE, MDPE, PP, COC, and SBC, with % by weight relative to (i.e., compared with) the total weight of the MDO film as taught herein.

In certain embodiments, the core layer of the MDO film as defined herein may comprise from about 1% to about 90% by weight of HDPE and/or mHDPE, with % by weight compared with the total weight of the MDO film. In certain embodiments, the core layer of the MDO film may comprise from about 5% to about 90%, from about 5% to about 85%, from about 10% to about 80%, from about 15% to about 75%, from about 20% to about 70%, from about 25% to about 60%, or from about 30% to about 50% by weight of HDPE and/or mHDPE, with % by weight relative to (i.e., compared with) the total weight of the MDO film.

In certain embodiments, the core layer of the MDO film as defined herein may comprise from about 1% to about 90% by weight of MDPE and/or mMDPE, with % by weight compared with the total weight of the MDO film. In certain embodiments, the core layer of the MDO film may comprise from about 5% to about 90%, from about 5% to about 85%, from about 10% to about 80%, from about 15% to about 75%, from about 20% to about 70%, from about 25% to about 65%, from about 30% to about 60%, or from about 40% to about 60% by weight of MDPE and/or mMDPE, with % by weight relative to (i.e., compared with) the total weight of the MDO film.

In certain embodiments, the core layer of the MDO film as defined herein comprises from about 1% to about 90% by weight of PP, with % by weight compared with the total weight of the MDO film. For instance, the core layer of the MDO film may comprise from about 5% to about 90%, from about 5% to about 85%, from about 10% to about 80%, from about 15% to about 75%, from about 20% to about 70%, from about 25% to about 60%, or from about 30% to about 50% by weight of PP, with % by weight relative to (i.e., compared with) the total weight of the MDO film.

In certain embodiments, the core layer of the MDO film as defined herein comprises from about 1% to about 90% by weight of COC, with % by weight relative to (i.e., compared with) the total weight of the MDO film. For instance, the core layer of the MDO film may comprise from about 5% to about 90%, from about 5% to about 85%, from about 10% to about 80%, from about 15% to about 75%, from about 20% to about 70%, from about 25% to about 60%, from about 30% to about 50% by weight of COC, with % by weight relative to (i.e., compared with) the total weight of the MDO film. For instance, the core layer of the MDO film may comprise from about 1% to about 25%, from about 1% to about 20%, from about 1% to about 15%, from about 1% to about 10%, from about 5% to about 25%, or from about 10% to about 25% by weight of COC, with % by weight relative to (i.e., compared with) the total weight of the MDO film.

In certain embodiments, the core layer of the MDO film as defined herein comprises from about 1% to about 90% by weight of SBC, with % by weight relative to (i.e., compared with) the total weight of the MDO film. For instance, the core layer of the MDO film may comprise from about 5% to about 90%, from about 5% to about 85%, from about 10% to about 80%, from about 15% to about 75%, from about 20% to about 70%, from about 25% to about 60%, from about 30% to about 50% by weight of SBC, with % by weight relative to (i.e., compared with) the total weight of the MDO film. For instance, the core layer of the MDO film may comprise from about 1% to about 25%, from about 1% to about 20%, from about 1% to about 15%, from about 1% to about 10%, from about 5% to about 25%, or from about 10% to about 25% by weight of SBC, with % by weight relative to (i.e., compared with) the total weight of the MDO film.

In certain embodiments, the inner layer may comprise EVA and/or EBA and/or EMA and/or plastomers. The inner layer allows both inner layers to stick or bind to each other when the extruded blown film is blocked in the nip rollers.

In certain embodiments, the MDO film as defined herein may comprise additional or further layers between the inner layer and the core layer, and/or between the core layer and the outer layer. In certain embodiments, the additional layer may comprise LLDPE and/or mLLDPE and/or plastomers. In certain embodiments, the additional layer may comprise one or more polymers selected from the group consisting of HDPE, MDPE, PP, COC, and SBC. In certain embodiments, the additional layer may comprise LLDPE and/or mLLDPE and/or plastomers and one or more polymers selected from the group consisting of HDPE, MDPE, PP, COC, and SBC.

In certain embodiments, the thickness of the layers (e.g., outer layer, core layer, inner layer, and additional layer(s)) in the MDO film as defined herein may vary. In certain embodiments, the outer and inner layer may be thinner than the core layer. For example, the MDO film as defined herein may have a film structure of 20%/60%/20%/20%/60%/20% for the outer layer/core layer/inner layer/inner layer/core layer/outer layer. The layer configuration may be dependent on the die design and extruder size.

The ensuing statements provide additional illustration of certain aspects and embodiments that have been disclosed in accordance with the present invention:

1. A method for packaging a compressible product in a compressed state, comprising the step of sealing at least two parts of a polymeric machine direction oriented (MDO) film which encloses at least part of the compressible product in the compressed state, characterised in that the seal has a seal elongation at failure of about 20% to about 100%, as measured in accordance with ASTM F88/F88M-09.

2. The method according to statement 1, wherein the seal has a seal elongation at failure of about 25% to about 100%, preferably the seal has a seal elongation at failure of about 30% to about 90%, more preferably the seal has a seal elongation at failure of about 35% to about 80%, even more preferably the seal has a seal elongation at failure of about 35% to about 55%, as measured in accordance with ASTM F88/F88M-09.
3. The method according to statement 1 or 2, wherein the sealing comprises heat sealing, preferably wherein the sealing is heat sealing.
4. The method according to any one of statements 1 to 3, wherein the compressible product is an insulation product.
5. The method according to any one of statements 1 to 4, wherein the compressible product is a mineral wool product, such as a mineral wool slab or a mineral wool roll.
6. The method according to any one of statements 1 to 5, wherein the MDO film has a tensile creep in the machine direction of about 0.10% to about 0.50% per μm thickness of the film, as measured in accordance with ISO 899-1-2003 with following conditions: sample width of 15 mm, grip distance of 100 mm, a load of 2300 g, for 24 hours, and at 23° C.
7. The method according to any one of statements 1 to 6, wherein the MDO film has a thickness of about 15 μm to about 100 μm.
8. The method according to any one of statements 1 to 7, wherein the MDO film has an elongation at break in the machine direction of about 100% to about 300%, preferably wherein the MDO film has an elongation at break in the machine direction of about 150% to about 250%, as measured in accordance with ASTM D882.
9. The method according to any one of statements 1 to 8, wherein the MDO film comprises one or more polymers selected from the group consisting of high density polyethylene (HDPE), medium density polyethylene (MDPE), polypropylene (PP), cyclic olefin copolymer (COC), and styrene butadiene copolymer (SBC).
10. The method according to any one of statements 1 to 9, wherein the MDO film comprises from about 1% to about 90% by weight of one or more polymers selected from the group consisting of one or more of HDPE, MDPE, PP, COC, and SBC, with % by weight relative to the total weight of the MDO film.
11. A compressible product in a compressed state packaged in a polymeric machine direction oriented (MDO) film which encloses at least part of the compressible product, wherein at least two parts of the MDO film are sealed and characterised in that the seal has a seal elongation at failure of about 20% to about 100%, as measured in accordance with ASTM F88/F88M-09.
12. The packaged product according to statement 11, wherein the seal has a seal elongation at failure of about 25% to about 100%, preferably the seal has a seal elongation at failure of about 30% to about 90%, more preferably the seal has a seal elongation at failure of about 35% to about 80%, even more preferably the seal has a seal elongation at failure of about 35% to about 55%, as measured in accordance with ASTM F88/F88M-09.
13. The packaged product according to statement 11 or 12, wherein the sealing comprises heat sealing, preferably wherein the sealing is heat sealing.
14. The packaged product according to any one of statements 11 to 13, wherein the compressible product is an insulation product.
15. The packaged product according to any one of statements 11 to 14, wherein the compressible product is a mineral wool product, such as a mineral wool slab or a mineral wool roll.
16. The packaged product according to any one of statements 11 to 15, wherein the MDO film has a tensile creep in the machine direction of about 0.10% to about 0.50% per μm thickness of the film, as measured in accordance with ISO 899-1-2003, with following conditions: sample width of 15 mm, grip distance of 100 mm, a load of 2300 g, for 24 hours, and at 23° C.
17. The packaged product according to any one of statements 11 to 16, wherein the MDO film has a thickness of about 15 μm to about 100 μm.
18. The packaged product according to any one of statements 11 to 17, wherein the MDO film has an elongation at break in the machine direction of about 100% to about 300%, preferably wherein the MDO film has an elongation at break in the machine direction of about 150% to about 250%, as measured in accordance with ASTM D882.
19. The packaged product according to any one of statements 11 to 18, wherein the MDO film comprises one or more polymers selected from the group consisting of high density polyethylene (HDPE), medium density polyethylene (MDPE), polypropylene (PP), cyclic olefin copolymer (COC), and styrene butadiene copolymer (SBC).
20. The packaged product according to any one of statements 11 to 19, wherein the MDO film comprises from about 1% to about 90% by weight of one or more polymers selected from the group consisting of one or more of HDPE, MDPE, PP, COC, and SBC, with % by weight relative to the total weight of the MDO film.
21. A polymeric machine direction oriented (MDO) film for packaging a compressible product in a compressed state, characterised in that the MDO film, when at least two parts of the MDO film are sealed, provides a seal with a seal elongation at failure of about 20% to about 100%, as measured in accordance with ASTM F88/F88M-09.
22. The MDO film according to statement 21, wherein the seal has a seal elongation at failure of about 25% to about 100%, preferably the seal has a seal elongation at failure of about 30% to about 90%, more preferably the seal has a seal elongation at failure of about 35% to about 80%, even more preferably the seal has a seal elongation at failure of about 35% to about 55%, as measured in accordance with ASTM F88/F88M-09.
23. The MDO film according to statement 21 or 22, wherein the sealing comprises heat sealing, preferably wherein the sealing is heat sealing.
24. The MDO film according to any one of statements 21 to 23, wherein the MDO film has a tensile creep in the machine direction of about 0.10% to about 0.50% per μm thickness of the film, as measured in accordance with ISO 899-1-2003 with following conditions: sample width of 15 mm, grip distance of 100 mm, a load of 2300 g, for 24 hours, and at 23° C.
25. The MDO film according to any one of statements 21 to 24, wherein the MDO film has a thickness of about 15 μm to about 100 μm.
26. The MDO film according to any one of statements 21 to 25, wherein the MDO film has an elongation at break in the machine direction of about 100% to about 300%, preferably wherein the MDO film has an elongation at break in the machine direction of about 150% to about 250%, as measured in accordance with ASTM D882.

27. The MDO film according to any one of statements 21 to 26, wherein the MDO film comprises one or more polymers selected from the group consisting of high density polyethylene (HDPE), medium density polyethylene (MDPE), polypropylene (PP), cyclic olefin copolymer (COC), and styrene butadiene copolymer (SBC).

28. The MDO film according to any one of statements 21 to 27, wherein the MDO film comprises from about 1% to about 90% by weight of one or more polymers selected from the group consisting of one or more of HDPE, MDPE, PP, COC, and SBC, with % by weight relative to the total weight of the MDO film.

While preferred embodiments of the present invention have been shown and described herein, it will be obvious to those skilled in the art that such embodiments are provided by way of example only.

The above aspects and embodiments are further supported by the following non-limiting examples.

EXAMPLES

Example 1: Elongation at Break of an MDO Film According to an Embodiment of the Invention A machine direction oriented (MDO) film according to an embodiment of the present invention (i.e., MDO Film A1) was produced by stretching a film with a thickness of 205 μm in an MDO unit in the machine direction with a stretching ratio of 1:2.9. The MDO Film A1 was prepared from a 5-layer coextruded blown film containing the following polymers: layer A: 75% by weight of LLDPE and 25% by weight of plastomer; layer B: LLDPE; layer C: 75% by weight of LLDPE and 25% by weight of cyclic olefin copolymer (COC); layer D: LLDPE; layer E: ethylene-vinyl acetate (EVA). The % by weight is compared with the total weight of each layer. If no percentages are given, the entire layer is prepared of the indicated polymer. This coextruded blown film was blocked in the nip rolls of the blown film line due to the stickiness of layer E, to form a 10 layer film (2 times 102.5 μm). The resulting film was then brought into the MDO unit where it was oriented in machine direction with a stretching ratio of 1:2.9 to a mono-oriented film with a thickness of 70 μm, i.e., MDO Film A1.

The MDO Film A1 was subjected to a tensile elongation at break test in the machine direction on a laboratory tensile tester in accordance with ASTM D882. A strip of film having a width of 15 mm was clamped between two clamps which have a distance of 50 mm from each other. Subsequently, the film was stretched at a rate of 500 mm/min until the film broke.

Table 1 shows the results of the measurements of the elongation at break (in %) and the force at break (in N) of MDO Film A1. MDO Film A1 had and an average elongation at break in the machine direction of 210% and an average force at break of 113N.

TABLE 1

Elongation at break (in %) and force at break (in N) of MDO Film A1 according to an embodiment of the present invention (n = 6)

| Measurement number | Elongation at break (%) | Force at break (N) |
|---|---|---|
| 1 | 195 | 105 |
| 2 | 218 | 112 |
| 3 | 201 | 114 |
| 4 | 209 | 114 |
| 5 | 220 | 117 |

TABLE 1-continued

Elongation at break (in %) and force at break (in N) of MDO Film A1 according to an embodiment of the present invention (n = 6)

| Measurement number | Elongation at break (%) | Force at break (N) |
|---|---|---|
| 6 | 216 | 118 |
| Average ± SD | 210 ± 10 | 113 ± 5 |

SD: standard deviation

The MDO Film A1 had an elongation at break different form the elongation at break of existing mono-oriented films currently on the market used for packing compressible product such as mineral wool products, which typically have an elongation at break in machine direction of about 20% to about 90%. An exemplary film according to the prior art (i.e., comparative Film B1) was produced by stretching a film with a thickness of 420 μm in an MDO unit in the machine direction with a stretching ratio of 1:6. The comparative Film B1 was prepared from a 5-layer coextruded blown film containing the following polymers: layer A: 75% by weight of LLDPE and 25% by weight of plastomer; layer B: LLDPE; layer C: LLDPE; layer D: LLDPE; layer E: EVA. The % by weight is compared with the total weight of each layer. If no percentage is given, the entire layer is prepared of the indicated polymer. This coextruded blown film was blocked in the nip rolls of the blown film line due to the stickiness of layer E, to a 10 layer film (2 times 210 μm). The resulting film was then brought into the MDO unit where it was oriented in machine direction with a stretching ratio of 1:6 to a mono-oriented film with a thickness of 70 μm, i.e., comparative Film B1.

The comparative Film B1 was subjected to a tensile elongation at break test in the machine direction on a laboratory tensile tester in accordance with ASTM D882. A strip of film having a width of 15 mm was clamped between two clamps which have a distance of 50 mm from each other. Subsequently, the film was stretched at a rate of 500 mm/min until the film broke.

Table 2 shows the results of the elongation at break (in %) and the force at break (in N) of the comparative Film B1. The comparative Film B1 had and an average elongation at break in the machine direction of 58% and an average force at break of 170N.

TABLE 2

Elongation at break (in %) and force at break (in N) of a comparative Film B1 (n = 5)

| Measurement number | Elongation at break (%) | Force at break (N) |
|---|---|---|
| 1 | 54 | 168 |
| 2 | 60 | 163 |
| 3 | 61 | 175 |
| 4 | 60 | 175 |
| 5 | 54 | 170 |
| Average ± SD | 58 ± 3 | 170 ± 5 |

SD: standard deviation

Example 2: Seal Elongation at Failure of an MDO Film According to an Embodiment of the Invention The seal elongation at failure of an MDO film illustrating the principles of invention (i.e., MDO Film A2) and of an mono-oriented film according to the prior art (i.e., comparative Film B2) was determined on samples prepared in accordance with ASTM F2029-08 (Standard practices for making heat seals for determination of heat sealability of flexible webs as measured by seal strength).

The MDO Film A2 was prepared from a 5-layer coextruded blown film containing the following polymers: layer A: 75% by weight of LLDPE and 25% by weight of plastomer; layer B: LLDPE; layer C: 75% by weight of LLDPE and 25% by weight of cyclic olefin copolymer (COC); layer D: LLDPE; layer E: ethylene-vinyl acetate (EVA). The % by weight is compared with the total weight of each layer. If no percentage is given, the entire layer is prepared of the indicated polymer. The coextruded blown film was blocked in the nip rolls of the blown film line due to the stickiness of layer E, to a 10 layer film (2 times 87 µm). The resulting film was then brought into the MDO unit where it was oriented in machine direction with a stretching ratio of 1:2.9 to a mono-oriented film with a thickness of 60 µm.

The comparative MDO film B2 was prepared from a 5-layer coextruded blown film containing the following polymers: layer A: 75% by weight of LLDPE and 25% by weight of plastomer; layer B: LLDPE; layer C: LLDPE; layer D: LLDPE; layer E: EVA. The % by weight is compared with the total weight of each layer. If no percentage is given, the entire layer is prepared of the indicated polymer. The coextruded blown film was blocked in the nip rolls of the blown film line due to the stickiness of layer E, to a 10 layer film (2 times 180 µm). The resulting film was then brought into the MDO unit where it was oriented in machine direction with a stretching ratio of 1:6 to a mono-oriented film with a thickness of 60 µm.

The samples were sealed perpendicular to the machine direction of the film with heat sealing equipment (Brugger HSG-C) utilizing hot-bar jaws. The following conditions were used: 1 sec. dwell time, 100 N sealing pressure, 5 mm jaw width, and a heat seal temperature of 160° C. The seal elongation at failure of the above prepared film samples was measured in accordance with ASTM F88/F88M-09 (with tail holding technique A) on a tensile testing machine. A sealed sample with a width of 15 mm was clamped between two grips with a distance of 50 mm and tested with a jaw separation speed of 250 mm/min. The tensile testing machine gave the curve of the seal force versus heat seal elongation (grip travel).

FIG. 1 represents a graph illustrating the seal strength (in N) versus the heat seal elongation (in %) of a seal prepared with the MDO film illustrating the principles of the present invention, i.e., MDO Film A2 (FIG. 1, full line), and of a seal prepared with a mono-oriented film according to the prior art, i.e., comparative Film B2 (FIG. 1, dashed line). MDO Film A2 (FIG. 1, full line) had a thickness of 60 µm. Comparative Film B2 (FIG. 1, dashed line) also had a thickness of 60 µm.

MDO Film A2 had a wide window of heat seal elongation and a heat seal elongation at failure of about 75%, while comparative Film B2 had a narrow window of heat seal elongation and a heat seal elongation at failure of about 16% only, as shown in FIG. 1. As a consequence, the heat seal of MDO Film A2 had a much higher capacity of absorbing forces of the compressed products, and also of shocks and movements during transport in comparison with the heat seal of the comparative Film B2.

Example 3: MDO Films According to Embodiments of the Present Invention

The advantages of the present invention are further illustrated by a comparison of 5 different films used for packaging compressible products such as mineral wool products in a compressed state.

The five different films were subjected to a tensile elongation at break test in the machine direction on a laboratory tensile tester in accordance with ASTM D882. A strip of film having a width of 15 mm was clamped between two clamps which have a distance of 50 mm from each other. Subsequently, the film was stretched at a rate of 500 mm/min until the film broke.

The five different films were subjected to a heat seal test whereby the heat seal elongation at failure was measured. The samples were prepared in accordance with ASTM F2029-08 with following conditions: 1 sec. dwell time, 100 N sealing pressure, 5 mm jaw width and a sealing temperature of 160° C. The heat seal elongation at failure of the film samples prepared as described above were measured in accordance with ASTM F88/F88M-09 (with tail holding technique A) on a tensile testing machine. A sealed sample with a width of 15 mm was clamped between two grips with a distance of 50 mm and tested with a jaw separation speed of 250 mm/min. The tensile testing machine gave a curve of seal force versus heat seal elongation (grip travel).

The five different films were subjected to a creep test (23° C./15 mm sample width/2300 g/100 mm grip distance/24 hours) in machine direction in accordance with ISO 899-1-2003.

The five different films were subjected to a practical packaging test at the tertiary packaging stage on machinery (Seelen line from Qubiqa) with adapted heat seal bars (Flexweld sealing bars from Qubiqa). Three multipacks (each containing four mineral wool (glass wool) rolls) were compressed with a force of 2100 N (i.e., high compression). Film A: a conventional (non-oriented) blown polyolefin film of manufacturer A with a thickness of 110 µm. The conventional blown polyethylene film was a HDPE blown monolayer film.

Film B: a mono-oriented film currently on the market of manufacturer B with a thickness of 70 µm.

Film C: a mono-oriented film currently on the market with a thickness of 70 µm. This comparative mono-oriented film was prepared from a 5-layer coextruded blown film containing the following polymers: layer A: 75% by weight of linear low density polyethylene (LLDPE) and 25% by weight of plastomer; layer B: LLDPE; layer C: LLDPE; layer D: LLDPE; layer E: ethylene-vinyl acetate (EVA). The % by weight is compared with the total weight of each layer. If no percentage is given, the entire layer is prepared of the indicated polymer. The 5-layer coextruded blown film was blocked in the nip rolls of the blown film line due to the stickiness of layer E, to form a 10 layer film (2×210 µm). The resulting film was then brought into the MDO unit, where it was oriented with a stretching ratio of 1:6 to a mono-oriented film with a thickness of 70 µm, i.e., Film C.

Film D: a machine direction oriented (MDO) film according to an embodiment of the invention with a thickness of 70 µm. This MDO film was prepared from a 5-layer coextruded blown film containing the following polymers: layer A: 75% by weight of LLDPE and 25% by weight of plastomer; layer B: LLDPE; layer C: 65% by weight of LLDPE and 35% by weight of COC; layer D: LLDPE; layer E: EVA. The % by weight is compared with the total weight of each layer. If no percentage is given, the entire layer is prepared of the indicated polymer. The coextruded blown film was blocked in the nip rolls of the blown film line due to the stickiness of layer E, to a 10 layer film (2×105 µm). The resulting film was then brought into the MDO unit where it was oriented in machine direction with a stretching ratio of 1:3 to a mono-oriented film with a thickness of 70 µm, i.e., Film D.

Film E: a machine direction oriented (MDO) film according to an embodiment of the invention with a thickness of 60 µm. This MDO film is a 5-layer coextruded blown film containing the following polymers: layer A: 75% by weight of LLDPE and 25% by weight of plastomer; layer B: LLDPE; layer C: 65% by weight of LLDPE and 35% by weight of COC; layer D: LLDPE; layer E: EVA. The % by weight is compared with the total weight of each layer. If no percentage is given, the entire layer is prepared of the indicated polymer. The coextruded blown film was blocked in the nip rolls of the blown film line due to the stickiness of layer E, to a 10 layer film (2×90 µm). The resulting film was then brought into the MDO unit where it was oriented in machine direction with a stretching ratio of 1:3 to a mono-oriented film of 60 µm, i.e., Film E.

The tensile elongation at break, the heat seal elongation at failure, and the tensile creep in the machine direction (MD) were measured. A practical packaging test was performed with the five different films A, B, C, D and E on machinery (Seelen line from Qubiqa) with adapted heat seal bars (Flexweld sealing bars). The results are shown in Table 3.

TABLE 3

Stretching ratio, thickness, tensile elongation at break, heat seal elongation at failure, tensile creep in the machine direction (MD), and results of packaging test of five films illustrating the present invention

|  | Stretching ratio | Thickness (µm) | Tensile elongation at break (%) | Heat seal elongation at failure (%) | Tensile creep MD (%) | Packaging test (# open packages) |
|---|---|---|---|---|---|---|
| Film A | None | 110 | 500 | 230 | 71 | 0 out of 10 |
| Film B | ±1:6 | 70 | 60 | 15 | 4 | 9 out of 10 |
| Film C | 1:6 | 70 | 52 | 16 | 4 | 9 out of 10 |
| Film D | 1:3 | 70 | 190 | 45 | 13 | 0 out of 10 |
| Film E | 1:3 | 60 | 180 | 45 | 20 | 0 out of 10 |

The conventional non-oriented polyolefin Film A was performing poor regarding creep (i.e., the tendency to elongate) and thickness. Film A had high tensile creep, i.e., high tendency to elongate, resulting in too high growing ratios of the packages. As a consequence, the compression ratios on the mineral wool were limited.

The comparative mono-oriented Films B and C with a heat seal elongation at failure of 15% and 16% respectively had good creep properties, but were performing poorly in heat sealing when packaging mineral wool in a compressed state. Nearly all packages were popping on the seal.

The MDO Film D according to an embodiment of the present invention, stretched in machine direction with a stretching ratio of 1:3, and with a tensile elongation at break in machine direction between 150 and 250%, had a heat seal elongation at failure of about 45% (Table 3, Film D). This heat seal elongation at failure was considerably higher in comparison with the heat seal elongation at failure of the comparative mono-oriented films, i.e., heat seal elongation at failure of 15% and 16%, for Film B and Film C, respectively (Table 3, Film B and C). As a result, the MDO Film D according to an embodiment of the invention gave a very satisfactory seal performance in a practical test without any open packages (Table 3, Film D) in comparison with the poor result of the comparative mono-oriented films (Table 3, Film B and C). Furthermore, although the tensile creep of the MDO Film D was higher than the tensile creep of the comparative mono-oriented Films B and C, the MDO Film D had sufficiently low tensile creep to satisfactorily withstand the expansion forces of the compressed mineral wool packages.

Even the thinner MDO Film E according to an embodiment of the present invention was performing excellent during practical tests. The MDO Film E also had sufficiently low tensile creep to withstand the expansion forces of the compressed mineral wool packages (Table 3, Film E).

In conclusion, the MDO films illustrating the principles of the present invention had an enhanced sealing behaviour on machinery for packaging compressible products such as mineral wool products. With the MDO films illustrating the principles of the invention, there was no need anymore to regularly align the heat sealing bars on a mineral wool packaging line. Moreover, the present MDO films were perfectly sealed, even on packaging lines which were until now unable to seal mono-oriented films according to prior art. The present MDO films brought an advantageous solution for an economical way of storing and transporting compressible products, such as mineral wool products, in a compressed state. Also regarding cost saving and environmental sustainability, the MDO films illustrating the principles of the present invention were very advantageous because they could be prepared as films with a reduced thickness.

The invention claimed is:

1. A polymeric machine direction oriented (MDO) film for packaging a compressible product in a compressed state, characterised in that the MDO film, when at least two parts of the MDO film are sealed, provides a seal with a seal elongation at failure of about 20% to about 100%, as measured in accordance with ASTM F88/F88M-09, wherein the MDO film has an elongation at break in the machine direction of about 100% to about 300%, as measured in accordance with ASTM D882, and the MDO film comprises from about 1% to about 90% by weight of one or more polymers selected from the group consisting of high density polyethylene (HDPE), medium density polyethylene (MDPE), cyclic olefin copolymer (COC), and styrene butadiene copolymer (SBC), with % by weight relative to the total weight of the MDO film.

2. The MDO film according to claim 1, wherein the seal has a seal elongation at failure of about 25% to about 100%, as measured in accordance with ASTM F88/F88M-09.

3. The MDO film according to claim 1, wherein the sealing comprises heat sealing.

4. The MDO film according to claim 1, wherein the MDO film has a tensile creep in the machine direction of about 0.10% to about 0.50% per µm thickness of the film, as measured in accordance with ISO 899-1-2003 with following conditions: sample width of 15 mm, grip distance of 100 mm, a load of 2300 g, 24 hours, and at 23° C.

5. The MDO film according to claim 1, wherein the MDO film has a thickness of about 15 µm to about 100 µm.

6. The MDO film according to claim 1, wherein the MDO film has an elongation at break in the machine direction of about 150% to about 250%, as measured in accordance with ASTM D882.

7. The MDO film according to claim 1, wherein the seal has a seal elongation at failure of about 30% to about 90%, as measured in accordance with ASTM F88/F88M-09.

8. The MDO film according to claim 1, wherein the seal has a seal elongation at failure of about 35% to about 80%, as measured in accordance with ASTM F88/F88M-09.

9. The MDO film according to claim 1, wherein the MDO film comprises from about 5% to about 85% by weight of the one or more polymers selected from the group consisting of HDPE, MDPE, COC, and SBC.

10. The MDO film according to claim 1, wherein the MDO film comprises from about 10% to about 80% by weight of the one or more polymers selected from the group consisting of HDPE, MDPE, COC, and SBC.

11. A method for packaging a compressible product in a compressed state, comprising the step of sealing at least two parts of the polymeric machine direction oriented (MDO) film as defined in claim 1 which encloses at least part of the compressible product in the compressed state, characterised in that the seal has a seal elongation at failure of about 20% to about 100%, as measured in accordance with ASTM F88/F88M-09.

12. The method according to claim 11, wherein the seal has a seal elongation at failure of about 25% to about 100%, as measured in accordance with ASTM F88/F88M-09.

13. The method according to claim 11, wherein the sealing comprises heat sealing.

14. The method according to claim 11, wherein the compressible product is an insulation product.

15. The method according to claim 11, wherein the compressible product is a mineral wool product.

16. The method according to of claim 11, wherein the MDO film has a tensile creep in the machine direction of about 0.10% to about 0.50% per μm thickness of the film, as measured in accordance with ISO 899-1-2003 with following conditions: sample width of 15 mm, grip distance of 100 mm, a load of 2300 g, 24 hours, and at 23° C.

17. The method according to claim 11, wherein the MDO film has a thickness of about 15 μm to about 100 μm.

18. The method according to claim 11, wherein the MDO film has an elongation at break in the machine direction of about 150% to about 250%, as measured in accordance with ASTM D882.

19. A compressible product in a compressed state packaged in the polymeric machine direction oriented (MDO) film as defined in claim 1 which encloses at least part of the compressible product, wherein at least two parts of the MDO film are sealed and characterised in that the seal has a seal elongation at failure of about 20% to about 100%, as measured in accordance with ASTM F88/F88M-09.

20. The packaged product according to claim 19, wherein the seal has a seal elongation at failure of about 25% to about 100%, as measured in accordance with ASTM F88/F88M-09.

21. The packaged product according to claim 19, wherein the sealing comprises heat sealing.

22. The packaged product according to claim 19, wherein the compressible product is an insulation product.

23. The packaged product according to claim 19, wherein the compressible product is a mineral wool product.

24. The packaged product according to claim 19, wherein the MDO film has a tensile creep in the machine direction of about 0.10% to about 0.50% per μm thickness of the film, as measured in accordance with ISO 899-1-2003 with following conditions: sample width of 15 mm, grip distance of 100 mm, a load of 2300 g, 24 hours, and at 23° C.

25. The packaged product according to claim 19, wherein the MDO film has a thickness of about 15 μm to about 100 μm.

26. The packaged product according to claim 19, wherein the MDO film has an elongation at break in the machine direction of about 150% to about 250%, as measured in accordance with ASTM D882.

* * * * *